(12) United States Patent
Davuluri et al.

(10) Patent No.: US 9,120,876 B2
(45) Date of Patent: Sep. 1, 2015

(54) PROCESS FOR PREPARATION OF SUGAMMADEX

(75) Inventors: Ramamohan Rao Davuluri, San Clemente, CA (US); Ravi Ponnaiah, Madurai (IN); Ravi Kanth Sribhashyam, Hyderabad (IN); Nandkumar Mecherili Valsan, Ernakulam (IN); Naresh Dongari, Nalgonda (IN); Prasad Chlnv, Guntur (IN); Guruswamy Batthini, Hyderabad (IN)

(73) Assignee: Ramamohan Rao Davuluri, San Clemente, CA (US)

( * ) Notice: Subject to any disclaimer, the term of this patent is extended or adjusted under 35 U.S.C. 154(b) by 145 days.

(21) Appl. No.: 13/818,658

(22) PCT Filed: Aug. 23, 2011

(86) PCT No.: PCT/IN2011/000562
§ 371 (c)(1),
(2), (4) Date: Feb. 23, 2013

(87) PCT Pub. No.: WO2012/025937
PCT Pub. Date: Mar. 1, 2012

(65) Prior Publication Data
US 2014/0221641 A1    Aug. 7, 2014

(30) Foreign Application Priority Data
Aug. 25, 2010 (IN) .......................... 2459/CHE/2010

(51) Int. Cl.
*C08B 37/16* (2006.01)
(52) U.S. Cl.
CPC ................................. *C08B 37/0012* (2013.01)
(58) Field of Classification Search
CPC ..................................................... C08B 37/0012
See application file for complete search history.

(56) References Cited

U.S. PATENT DOCUMENTS 4,980,463 A * 12/1990 Walkup et al. ................ 536/124

OTHER PUBLICATIONS

Chmurski et al., Tetrahedron Letters, 1997, 38(42), p. 7365-7368.*
Gadelle et al., Angew. Chem. Int. Ed. Engl., 1991, 30(1), p. 78-80.*
Khan et al., Chem. Rev., 1998, 98, p. 1977-1996.*

* cited by examiner

*Primary Examiner* — Jonathan S Lau
(74) *Attorney, Agent, or Firm* — Schmeiser, Olsen & Watts, LLP

(57) ABSTRACT

A novel process for the preparation of 6-perdeoxy-6-per-halo Gamma cyclodextrin which is a useful intermediate in the synthesis of Sugammadex is disclosed in the invention. The process involves reacting Gamma cyclodextrin with phosphorous halide in the presence of organic solvent.

8 Claims, No Drawings

PROCESS FOR PREPARATION OF SUGAMMADEX

FIELD OF THE INVENTION

The present invention relates to an industrially viable, cost effective process for manufacturing 6-perdeoxy-6-per-halo Gamma Cyclodextrin, a key intermediate in the synthesis of Sugammadex.

CROSS REFERENCE TO RELATED APPLICATION

This application is the complete specification and claims priority from the provisional specification No. 2459/CHE/2010 filed on 25 Aug. 2010

BACKGROUND OF THE INVENTION

Sugammadex is a modified γ-cyclodextrin, with a lipophilic core and a hydrophilic periphery.

Sugammadex (designation Org 25969, trade name Bridion) is an agent for reversal of neuromuscular blockade by the agent rocuronium in general anaesthesia. It is the first selective relaxant binding agent (SRBA). This gamma cyclodextrin has been modified from its natural state by placing eight carboxyl thio ether groups at the sixth carbon positions. These extensions extend the cavity size allowing greater encapsulation of the rocuronium molecule. These negatively charged extensions electrostatically bind to the positively charged ammonium group as well as contribute to the aqueous nature of the cyclodextrin. Sugammadex's binding encapsulation of rocuronium is one of the strongest among cyclodextrins and their guest molecules. The rocuronium molecule (a modified steroid) bound within Sugammadex's lipophilic core, is rendered unavailable to bind to the acetylcholine receptor at the neuromuscular junction. Sugammadex sodium contains 8 recurring glucose units each with 5 asymmetric carbon atoms, in total 40 asymmetric carbon atoms for the whole molecule.

The Sugammadex was disclosed in U.S. Pat. No. 6,670,340 by Akzo Nobel. The process for preparing Sugammadex is there outlined as follows: (Scheme-I)

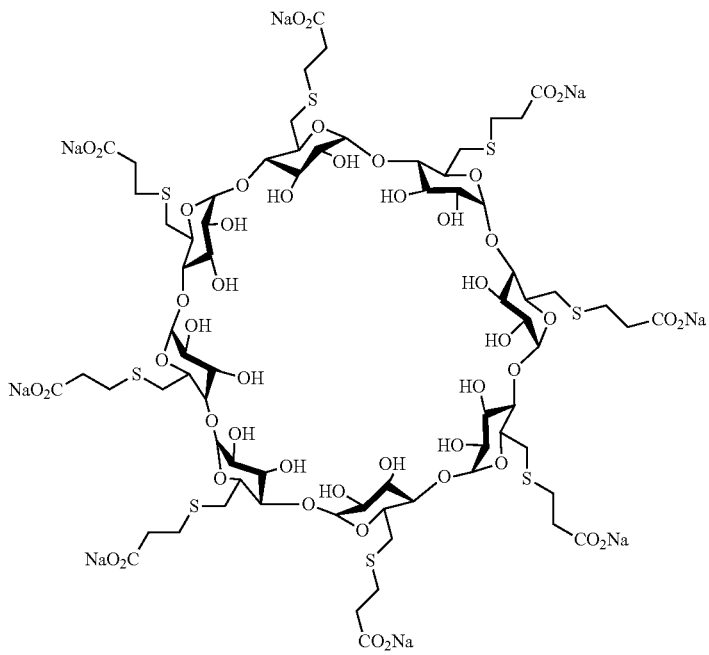

Scheme-I
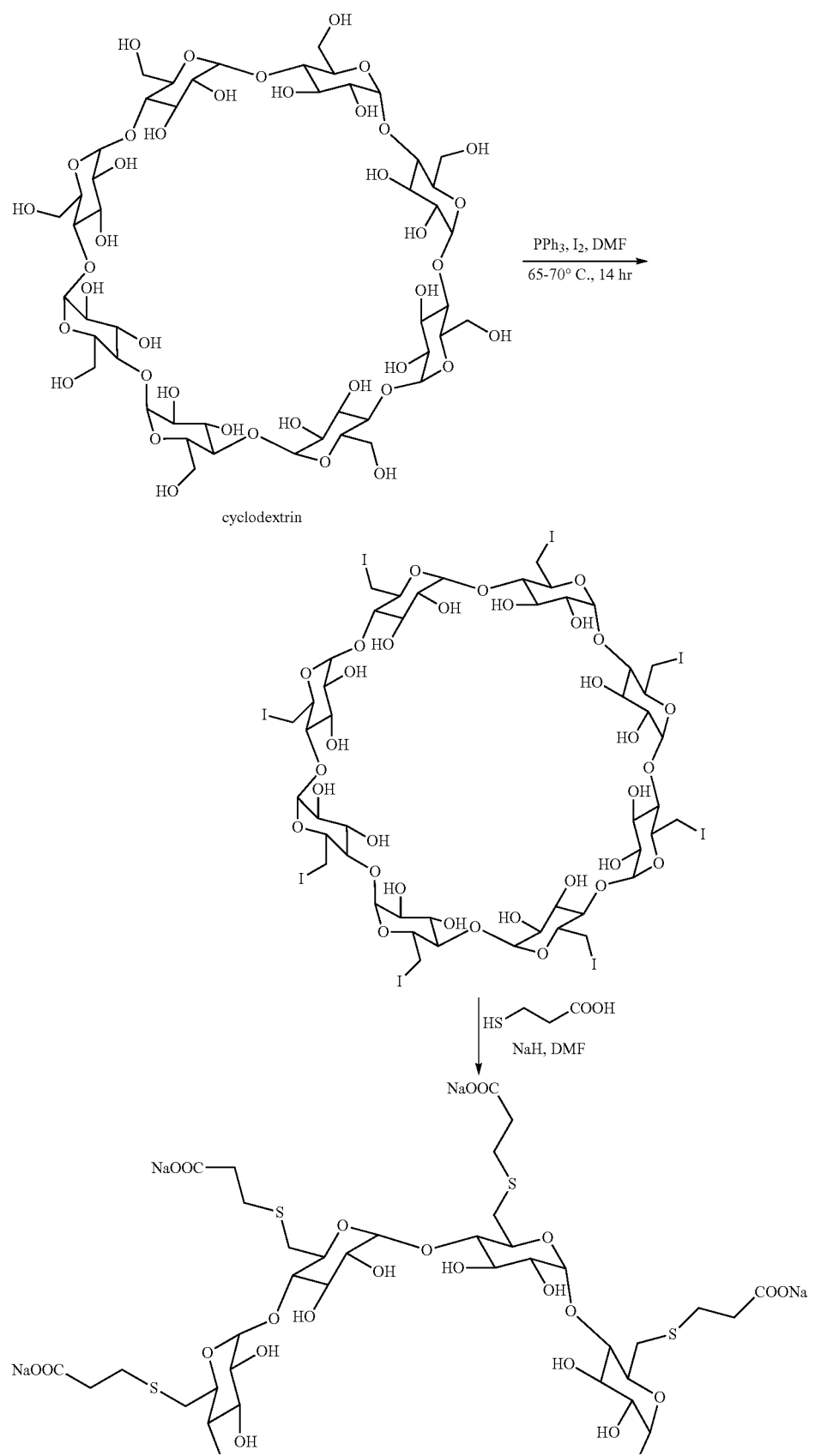

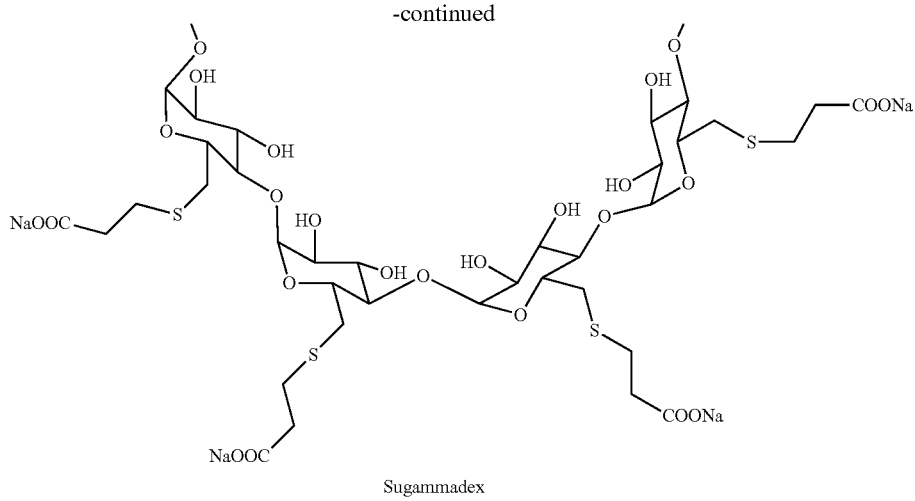

Sugammadex

In above process step-1 involves the preparation of Vilsmeier Hack reagent by the reaction of DMF, triphenylphosphine and Iodine. Drawback associated with this step is formation of triphenylphosphine oxide as a byproduct. Removal of triphenylphosphine oxide is very difficult from the reaction; it requires repeated washing with DMF under argon atmosphere and leads to inconsistency in yield of final product. Due to this, process is lengthy and not feasible on commercial scale.

The present invention provides improved conditions for carrying out step-1 in the above scheme, whereby the product of step-1 is obtained in better purity and yield than has previously been possible.

SUMMARY OF THE INVENTION

The invention is a novel process for the preparation of 6-perdeoxy-6-per-halo Gamma cyclodextrin which is a useful intermediate in the synthesis of Sugammadex, the process comprising of reacting Gamma cyclodextrin with phosphorous halide in presence of organic solvent. The 6-perdeoxy-6-per-halo Gamma cyclodextrin synthesized by the novel process is used in the preparation of Sugammadex.

The object of the present invention is to provide a novel process for the synthesis of 6-perdeoxy-6-per-halo Gamma Cyclodextrin, a useful intermediate in the synthesis of Sugammadex.

Another object of the present invention is to provide a process for producing 6-per-deoxy-6-per-(2-carboxyethyl) thio-γ-cyclodextrin sodium salt (Sugammadex) by employing the 6-perdeoxy-6-per-halo Gamma Cyclodextrin synthesized by the present invention.

DESCRIPTION OF THE INVENTION

In accordance with the present invention 6-perdeoxy-6-per-halo Gamma Cyclodextrin is obtained by the reaction of Gamma Cyclodextrin with phosphorous halide in an organic solvent. The process of the invention is depicted in following scheme-II Scheme-II

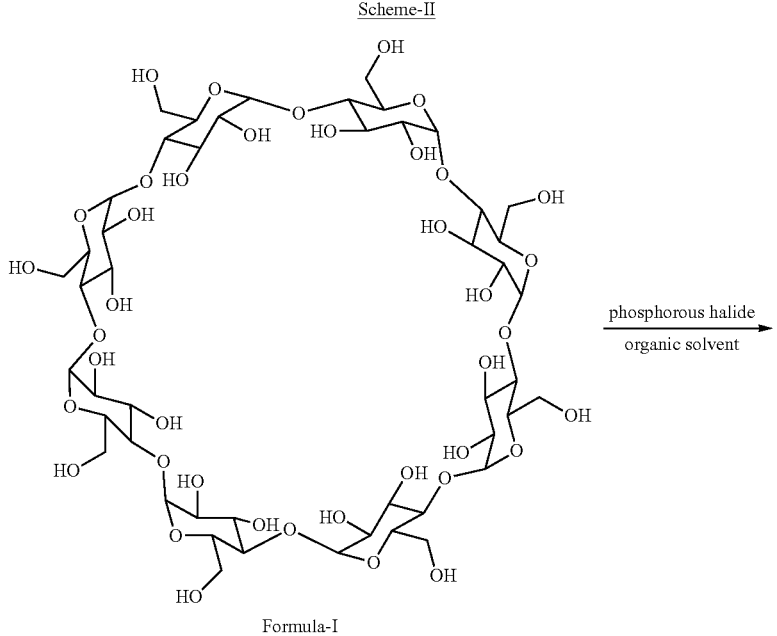

Formula-I

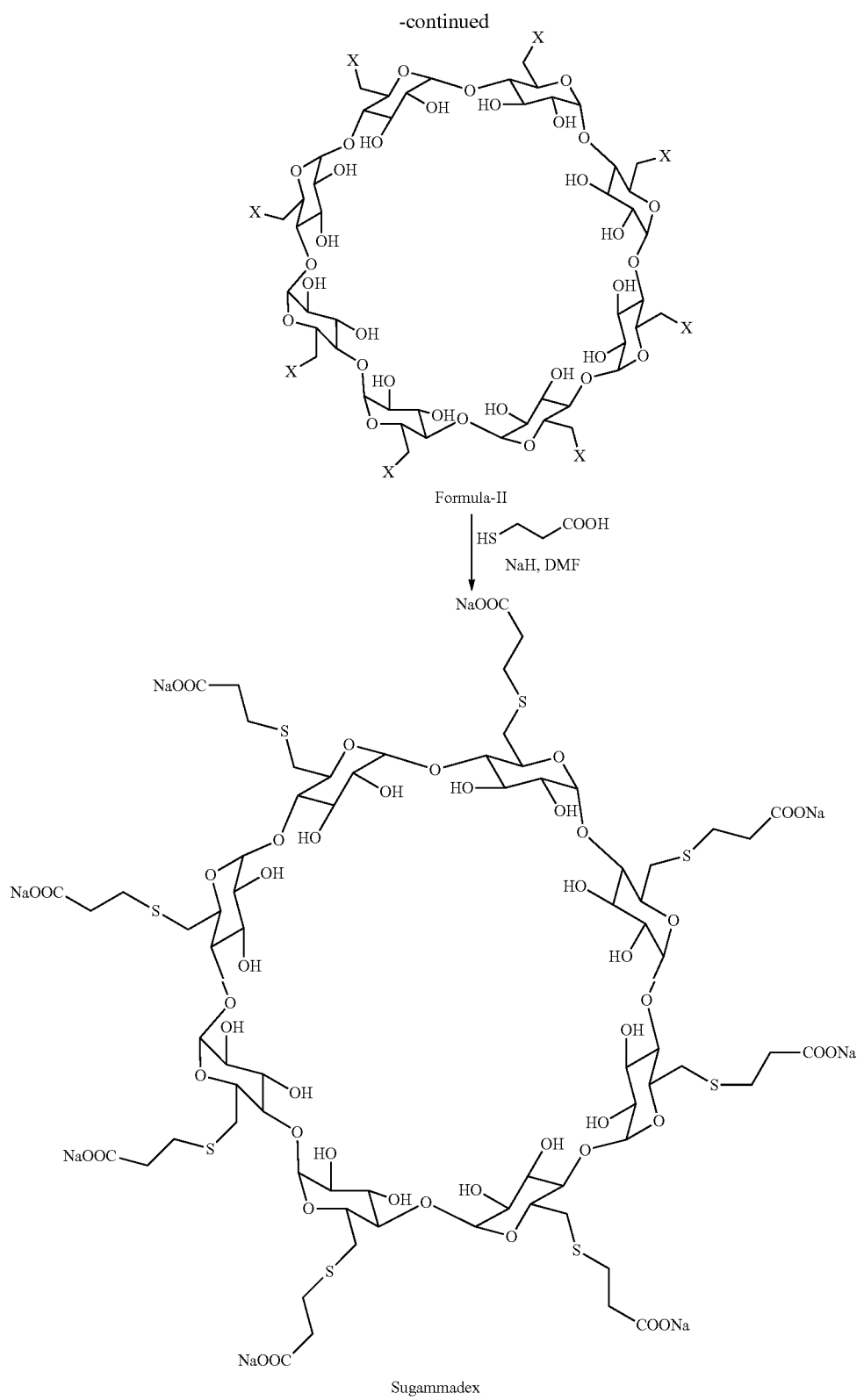

Sugammadex

The Gamma Cyclodextrin which is the starting material for the present process is commercially available or can be synthesized by the teachings of the prior art.

Phosphorous halide is $PX_5$ or $PX_3$ where X is an F, Cl, Br and Iodine, preferable chlorine.

The organic solvent can be polar organic solvent consisting of C1-5 esters, acetonitrile, dimethylformamide, dimethylsulfoxide, preferably dimethylformamide and the reaction is effectively carried out in between 60-100° C., preferably at 65-70° C.

In one embodiment, the present invention 6-perdeoxy-6-per-chloro Gamma Cyclodextrin (Formula-II-a) is obtained by the reaction of Gamma Cyclodextrin (Formula-I) with phosphorous pentachloride and dimethylformamide (DMF). The process of the invention is depicted in following scheme-III
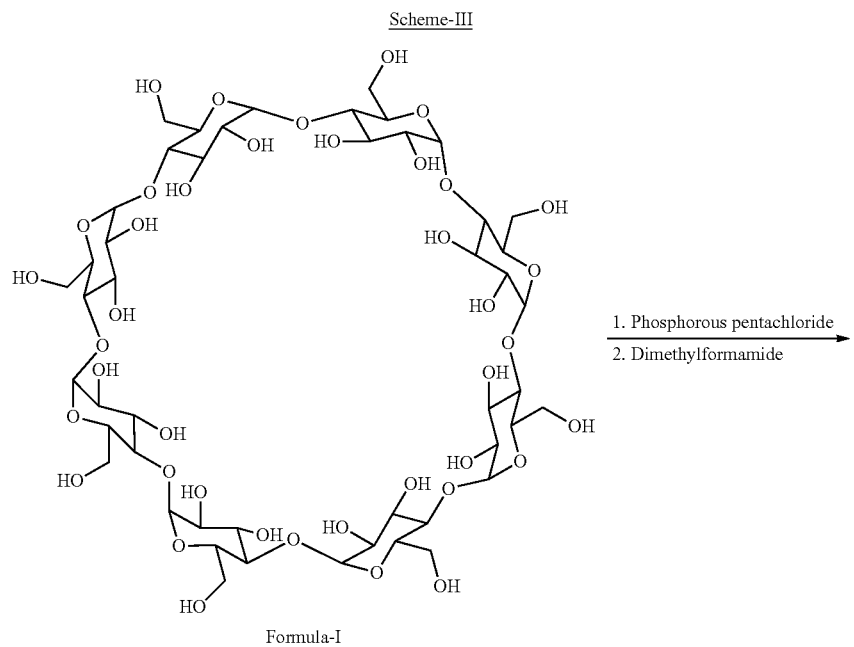
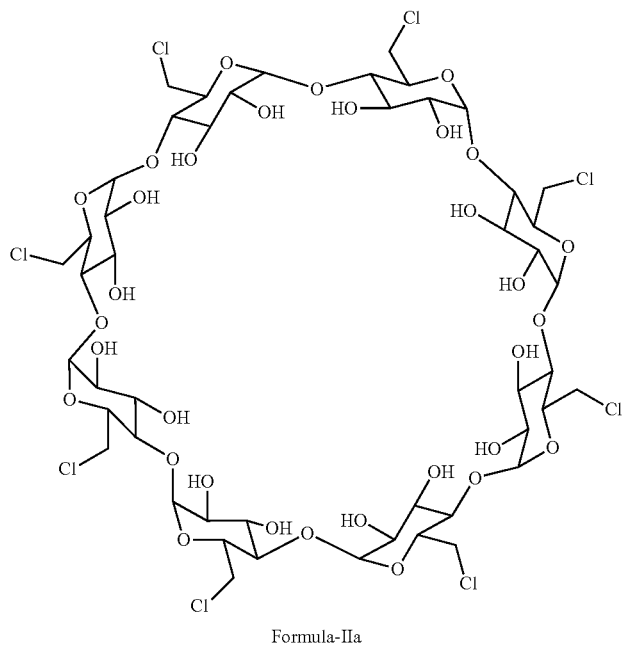

In the present invention Vilsmerier-Hack reagent is generated by reaction of DMF and $PCl_5$.

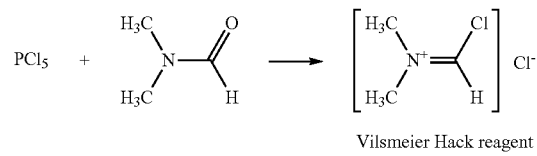

Vilsmeier Hack reagent

This reagent will react to gamma cyclodextrin to get halogenated product which is 6-perdeoxy-6-per-chloro Gamma Cyclodextrin. The reagent selectively reacts with per facial primary hydroxyl groups in presence of secondary hydroxyls.

In another embodiment, the preparation of 6-per-deoxy-6-per-(2-carboxyethyl)thio-γ-cyclodextrin sodium salt (Sugammadex) comprising:
a) Reacting gamma-cyclodextrin (Formula-I) with phosphorous pentachloride and dimethylformamide to obtain 6-perdeoxy-6-per-chloro Gamma cyclodextrin (Formula-IIa).
b) 6-perdeoxy-6-per-chloro Gamma cyclodextrin (Formula-IIa) is reacted with 3-mercapto propionic acid in presence of alkali metal hydrides and an organic solvent to give 6-per-deoxy-6-per-(2-carboxyethyl)thio-γ-cyclodextrin sodium salt. The process of the invention is depicted in following scheme-IV Scheme-IV

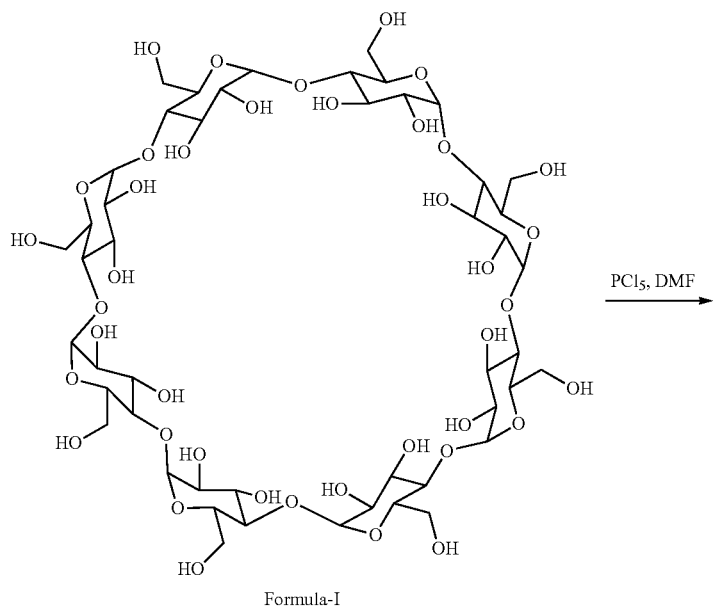

Formula-I

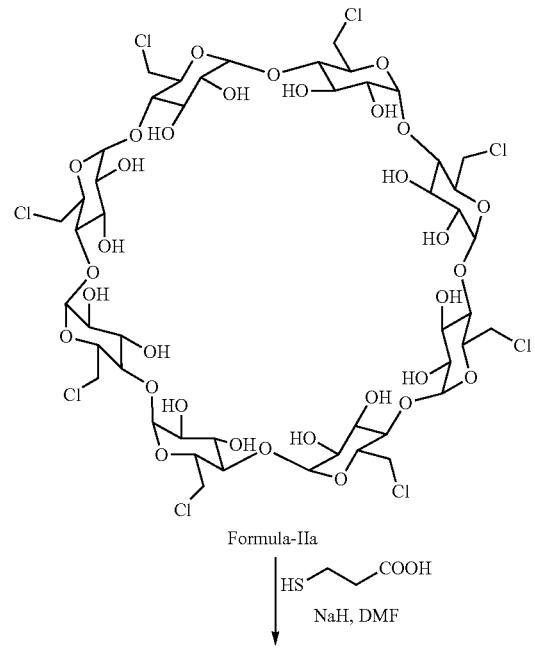

Formula-IIa

-continued

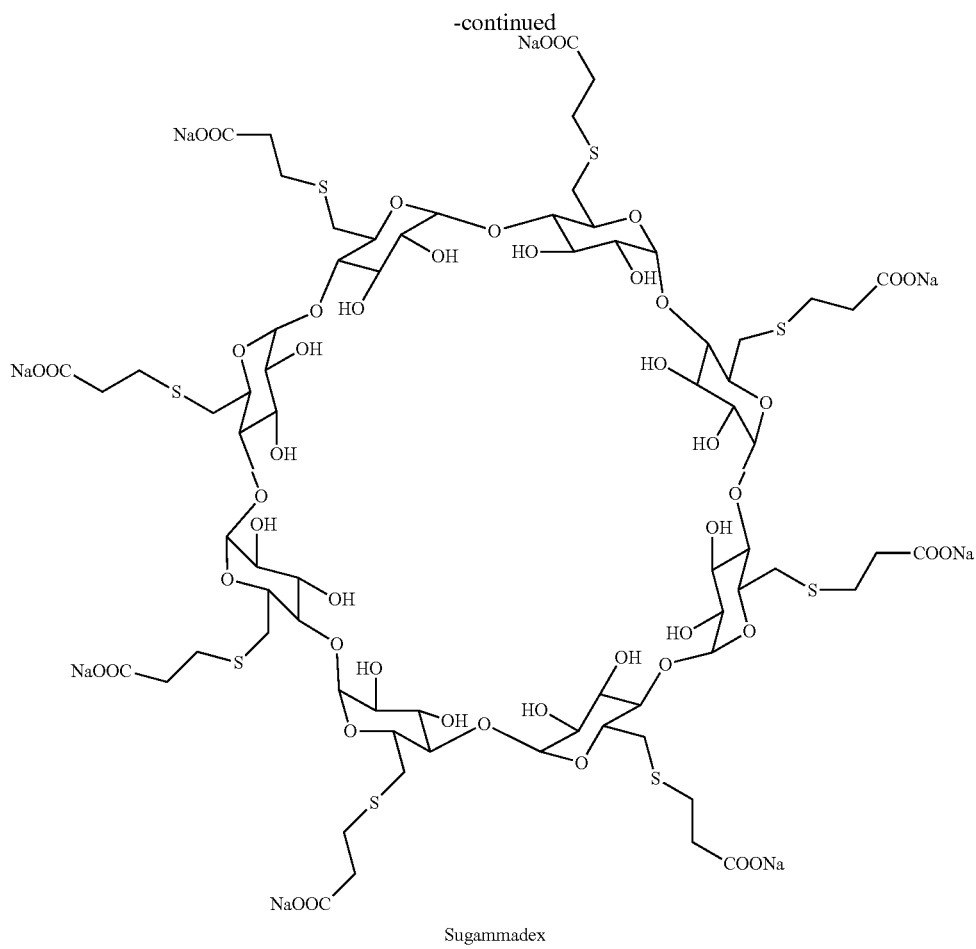

Sugammadex

The alkali metal hydrides are selected from the group consisting of sodium hydride, lithium hydride, potassium hydride preferably sodium hydride.

The advantage of the present process is there that there is no formation of by product such as triphenylphosphine oxide, as present in prior art process. So, purification is not required which leads to better purity and yields for the intermediate as well as for final product.

Another advantage of the present invention is the significant difference between molecular weight of 6-per deoxy-6-per-chloro-γ-cyclodextrin (Mol. wt. 1444) and the final product (Mol. wt. 2178). The use of 6-per deoxy-6-per-chloro-γ-cyclodextrin instead of 6-per deoxy-6-per-bromo-γ-cyclodextrin (Mol. wt. 1800) in the final stage of the process would extend the scope of selection of appropriate dialysis membranes with precise molecular weight cut off and there by facilitate efficient purification of Sugammadex.

The invention is further illustrated with following non-limiting examples:

Example: 1

Preparation of 6-perdeoxy-6-per-bromo Gamma Cyclodextrin

A portion of phosphorous pentachloride (256.5 g) was added in DMF (300 ml) at 0-5° C. Mixture was stirred at 20-25° C. for 1 hr. A solution of gamma-cyclodextrin (50 g) in DMF (400 ml) was added to above solution at 5-10° C. under nitrogen. Mixture was stirred at 65-70° C. 14 hrs. The reaction mixture was cooled to 20-25° C. and DMF was removed under vacuum. The viscous residue was diluted with water. 5M NaOH solution was added dropwise to the above solution at 5-10° C. until $P^H$=8, the resulting slurry was stirred for one hour at 20-25° C. The slurry was filtered under vacuum and washed with water and dried. The crude product was diluted with water and resulting slurry was stirred at 20-25° C. for one hour. The slurry was filtered under vacuum and the solid dried at 55-60° C. under vacuum for 12 hrs. (Yield—94-98%, purity-98.5% by HPLC)

Example: 2

Preparation of Sugammadax

To a mixture of sodium hydride (24.4 g) in DMF (150 ml) at 0-5° C., a solution of 3-mercapto propionic acid (23.7 ml, 10 eq) in DMF (50 ml) was added slowly under argon maintaining the temperature below 10° C. The resulting mixture was stirred at 20-25° C. for 30 mins. Then 6-deoxy-6-chloro gamma cyclodextrin (40 g) in DMF (400 ml) was added slowly at 5-10° C. under argon and the resulting mixture was heated to 70-75° C. for 12 hrs. Reaction mixture was cooled to 20-25° C. and DMF removed partially under vacuum and the reaction mixture is diluted with ethanol (600 ml). The resulting precipitate was stirred at 20-25° C. for 1 hr and filtered under vacuum and the solid dried to afford the crude Sugammadex (wet) (100 g). The crude product was purified over silica gel and sephadex G-25 column using water as eluent. (Yield 60%)

We claim:

1. A process for preparing 6-perdeoxy-6-per-halo Gamma cyclodextrin of Formula-II, by reacting gamma-cyclodextrin of Formula-I with a phosphorous halide in presence of an organic solvent

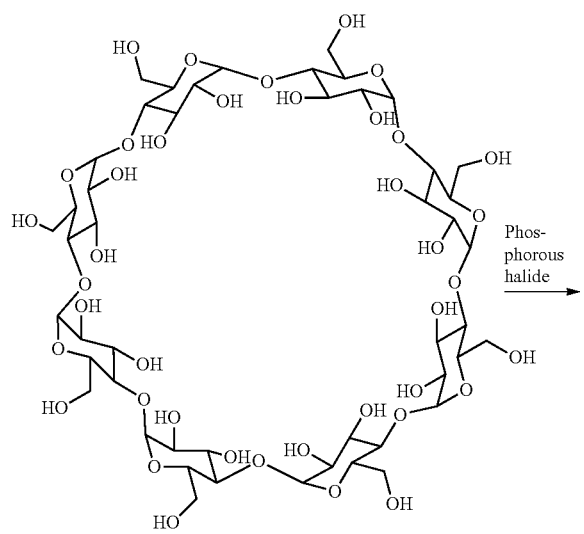

Formula-I

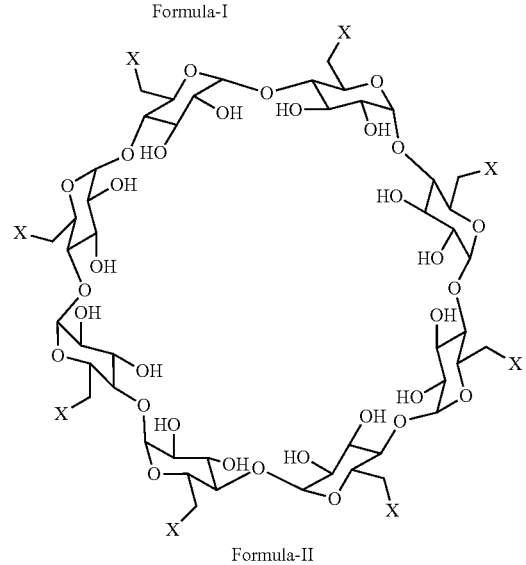

Formula-II wherein X in Formula-II is F or Cl or Br or iodine.

2. The process according to claim 1, wherein the phosphorous halide is $PX_5$ or $PX_3$ where X is an F, Cl, Br or iodine.

3. The process according to claim 2, wherein the phosphorous halide is $PCl_5$.

4. A process according to claim 1, wherein in the temperature is maintained from 60-100° C.

5. The process according to claim 1, wherein the organic solvent is a polar organic solvent selected from the group of polar aprotic solvents, $C_{1-5}$ esters, acetonitrile, dimethylformamide or dimethylsulfoxide.

6. The process according to claim 5, wherein the polar aprotic solvent is dimethylformamide.

7. A process for the preparation of 6-per-deoxy-6-per-(2-carboxyethyl)thio-γ-cyclodextrin sodium salt comprising:

a) reacting gamma-cyclodextrin (Formula-I) with phosphorous pentachloride and dimethylformamide to obtain 6-perdeoxy-6-per-chloro Gamma cyclodextrin (Formula-IIa);

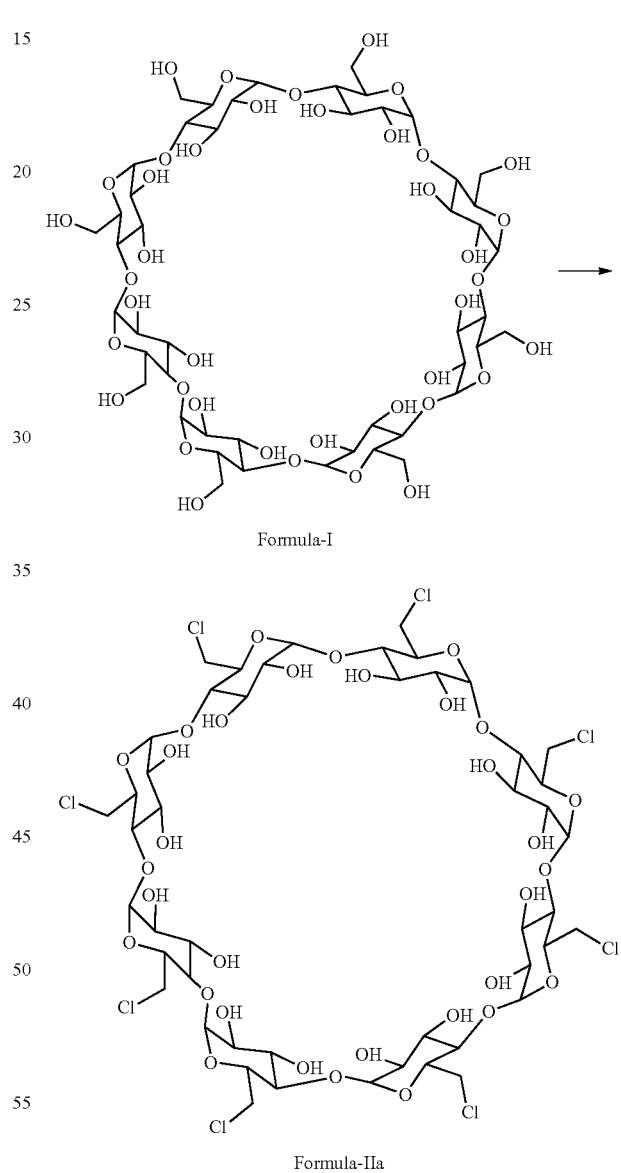

b) reacting 6-perdeoxy-6-per-chloro Gamma cyclodextrin (Formula-IIa) with 3-mercapto propionic acid in the presence of an alkali metal hydride and an organic solvent to give 6-per-deoxy-6-per-(2-carboxyethyl)thio-γ-cyclodextrin sodium salt

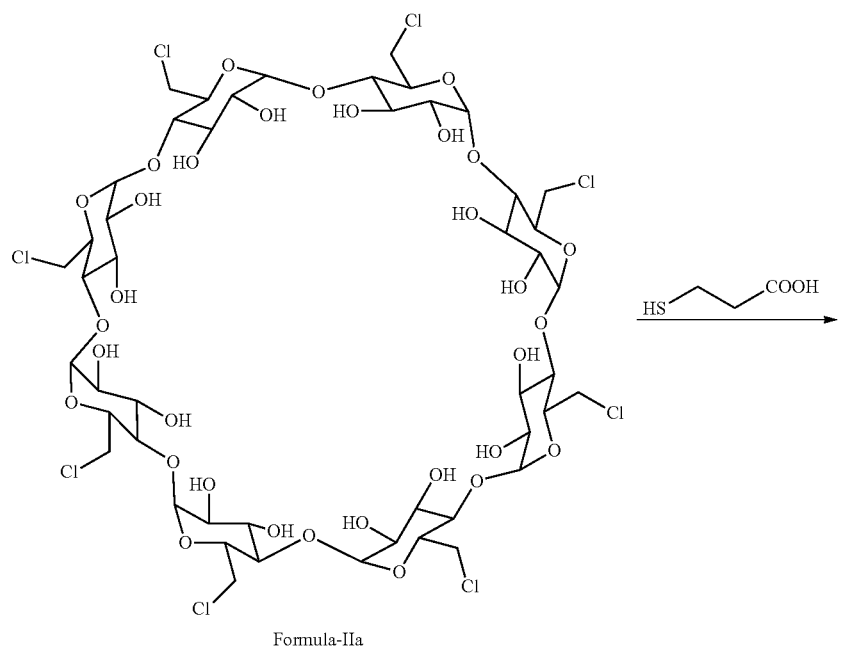
Formula-IIa
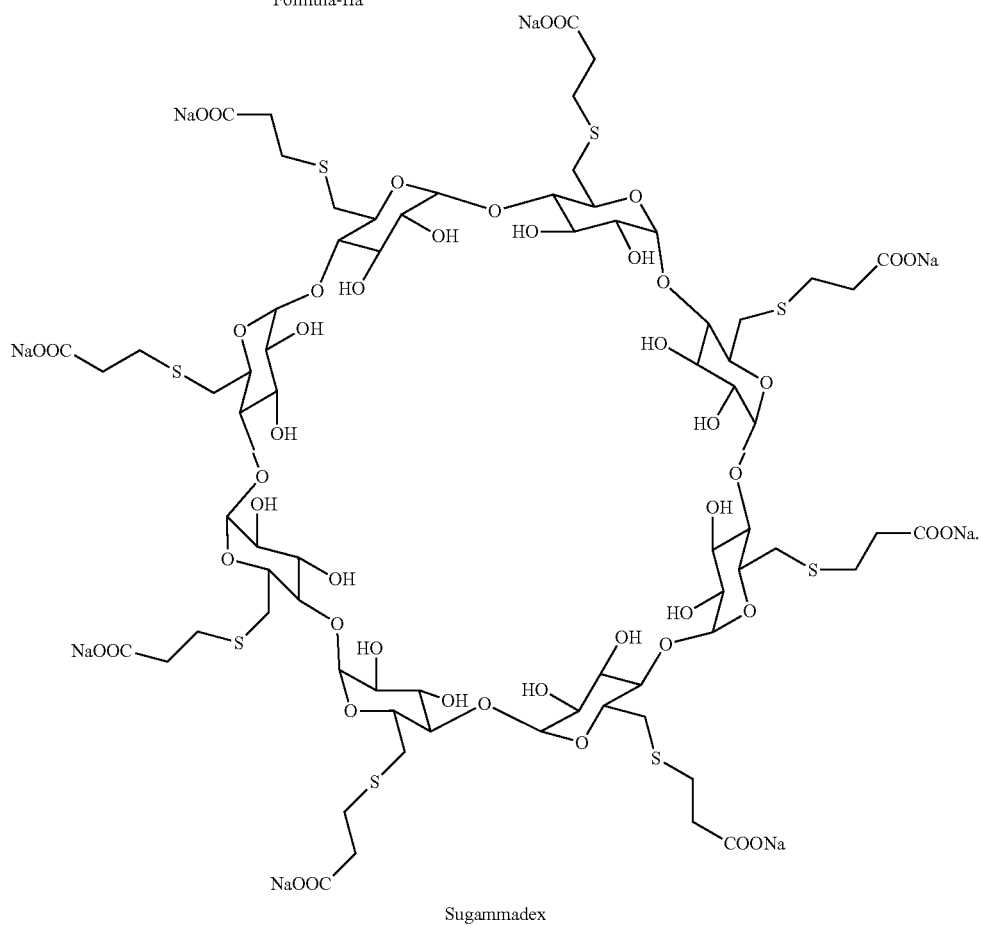
Sugammadex
8. The process according to claim 7 wherein the alkali metal hydride of step (b) is selected from the group consisting of sodium hydride, lithium hydride, potassium hydride and sodium hydride.
* * * * *